July 1, 1952 R. H. SAVAGE 2,601,953
PROCESS OF MAKING CHEMICALLY ACTIVE GRAPHITIC CARBON POWDER
Original Filed Aug. 12, 1948
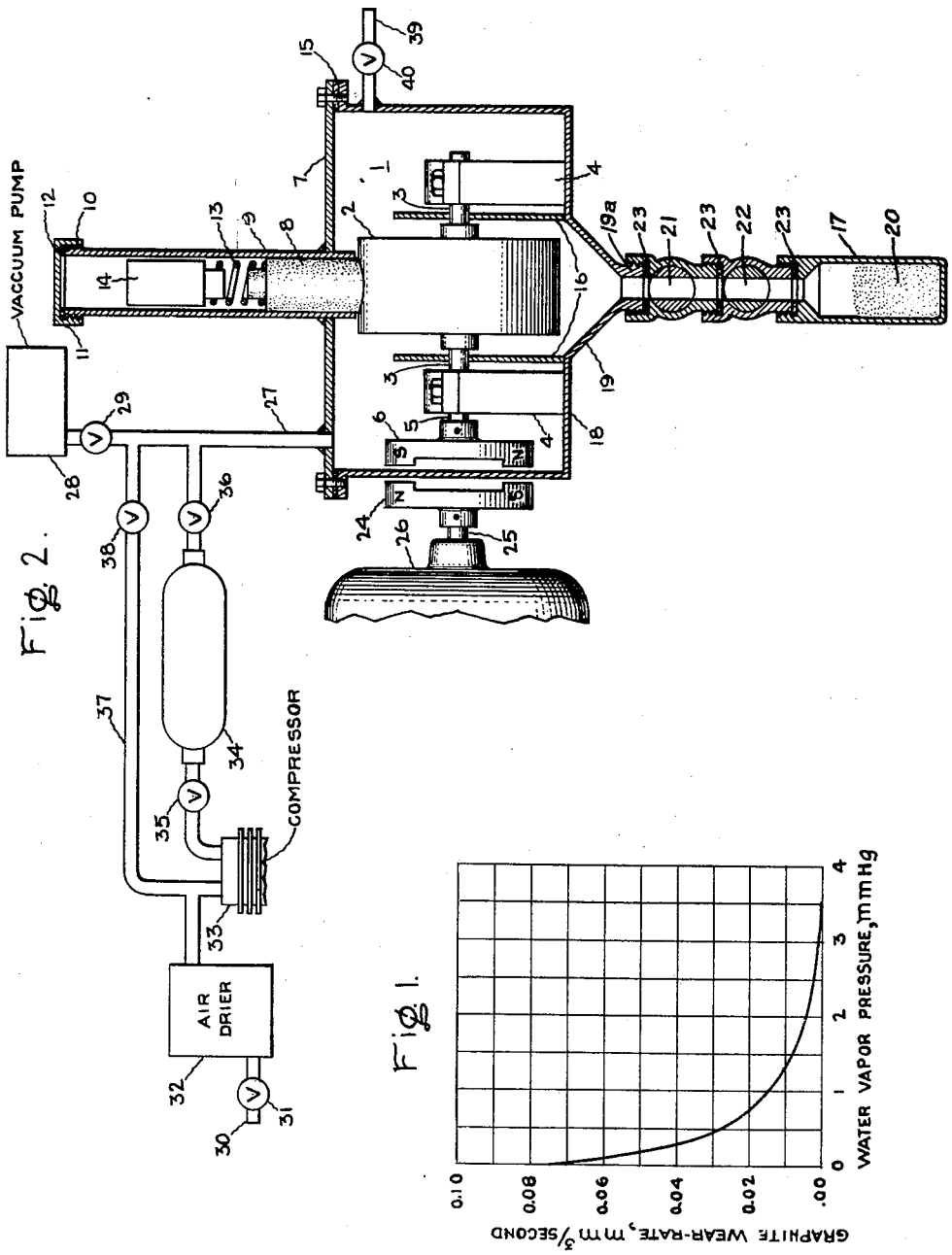
Inventor:
Robert H. Savage,
by Richard E. Horley
His Attorney.

Patented July 1, 1952

2,601,953

UNITED STATES PATENT OFFICE 2,601,953

PROCESS OF MAKING CHEMICALLY ACTIVE GRAPHITIC CARBON POWDER

Robert H. Savage, Scotia, N. Y., assignor to General Electric Company, a corporation of New York Original application August 12, 1948, Serial No. 43,854. Divided and this application June 30, 1949, Serial No. 102,213

5 Claims. (Cl. 241—18)

One of the uses of this new chemically active carbon powder is fully described and claimed in my copending application Serial No. 43,855, filed August 12, 1948, entitled "Machine and Method for Purifying the Inert Gases" filed concurrently herewith and assigned to the same assignee as the present invention. This application is a division of my copending application, Serial No. 43,854, filed August 12, 1948, and assigned to the same assignee as the present invention. The term "graphitic carbon" as used hereinafter in the specification is a generic term which is intended to mean elemental carbon which shows an X-ray diffraction pattern characteristic of a graphite lattice and, therefore, also includes graphite.

The use of activated carbons for the adsorption of gases has been appreciated for many years. However, the adsorption of such gases as nitrogen and hydrogen by activated carbons is accomplished in any desirable degree only at very low temperature (i. e. less than $-100°$ C.). Furthermore, the adsorption of these gases is only physical in nature, for the process is reversible and merely by increasing the temperature of the mixture of activated carbons and adsorbed gases, the adsorbed gases easily evaporate from the activated carbons and return to their free gaseous state. On the other hand, the adsorption of such gases as nitrogen and hydrogen by chemically active graphitic carbon powders produced by the comminuting apparatus of the present invention is found to be substantially irreversible and for that reason is referred to as chemical in nature.

There have also been attempts to produce ultrafine sized carbon particles which have resulted in the production of numerous carbon blacks. These carbon blacks, produced chiefly by the combustion of hydrocarbons, have many desirable qualities and have been used extensively in the paint industry, rubber industry, chemical industries, etc. The production of uniformly sized particles and of ultra-fine sized particles is expensive, and the production of carbon blacks has been in the past solely by thermal means. These carbon blacks differ considerably from the chemically active graphitic carbons described hereinafter.

One of the objects of my invention is to provide a method for producing chemically active graphitic carbon powders.

Another object of my invention is to provide a method for producing ultra-fine sized graphitic carbon powders of relatively uniform size.

Another object of my invention is to provide a method for producing ultra-fine sized graphitic carbon powders by mechanical means.

Another object of my invention is to provide a graphitic carbon powder which will irreversibly adsorb gases other than the inert gases.

Another object of my invention is to provide a graphitic carbon powder which when brought into contact with contaminated gases of the inert gas chemical group, will selectively and irreversibly adsorb the contaminating traces of nitrogen and hydrogen contained therein.

Further objects and advantages of my invention will become apparent as the following description proceeds and the features of novelty which characterize my invention will be pointed out with particularity in the claims annexed to and forming a part of this specification.

In order to fully describe my invention it is necessary to discuss the friction characteristics of graphitic carbon, the wear rates of graphitic carbon, and the variation of wear rates of graphitic carbon in the presence of certain gases.

The lubrication characteristics of graphite are not intrinsic in the graphite crystal structure alone but depend upon adsorption films such as are provided by the condensible vapors (e. g. water, benzene, n-hexane, diethylether, etc.). I have found that if these vapors are removed, the graphite seizes when subjected to abrasion and wears away as a fine dust in a size range which extends below the resolving power of the electron microscope. Further, I have found that this fine dust (referred to as "wear-dust") consists predominantly of ultra-fine graphite particles having unique chemical properties. The specific surface of the graphite, measured in square meters per gram, is increased by 200 to 400 fold in the wearing process, and the particles of graphite which are subjected to comminution are subdivided into extremely small fragments much smaller in size than any known carbon particles previously produced by mechanical methods and in the order of size of the very finest black colloidal carbon powders produced by chemical methods.

The wear-dust is found to be mainly black graphite particles. The specific surface of this wear-dust in some instances exceeds $10^4$ cm.$^2$ per gram of carbon. The fresh dust is extremely active while still under vacuum so that it "cleans up" (adsorbs) hydrogen and nitrogen and methane at low pressures even though it is not chilled. It is known that chilled activated carbons have a tendency to adsorb gases, but upon heating these activated carbon particles the gases are driven off. The fact that the subject graphite particles react with gases even though unchilled suggests that something other than physical adsorption is taking place. I believe that the bond between the fine graphite particles and the gases is of a chemical nature and that the wearing process involves a steady subdivision of graphite crystals to minute size including a continual tearing apart of the individual scales of graphite at right angles to the slip planes. The scission of intraplanar bonds involved is rather remarkable when it is remembered that these bonds are probably stronger than those in the diamond molecule as indicated by their shorter C—C distance. The exposed valence forces due to the scission of these bonds easily accounts for this activity of the graphite particles toward the gases mentioned at the relatively high room temperatures.

The effect of a non-lubricant gas upon the wear rate of graphite is indicated by the following. If the graphite brushes bear upon a copper disc in an evacuated chamber, a high friction coefficient is measured and the brushes wear at a great rate producing the wear-dust. With graphite brushes bearing on a copper disc in a chamber in which there is water vapor, the high friction coefficient ($\mu=80$ per cent) which persists in vacuum shows an immediate drop. At a water vapor pressure of 3 mm. Hg the wear rate falls practically to zero ($<10^{-4}$ mm.$^3$/second), and the friction becomes low ($\mu=18$ per cent) and constant. This effect is found to be quickly reversible, an equilibrium being reached between wear rate and water vapor pressure as shown by the graph Fig. 1. At water vapor pressures above 3 mm. Hg the brushes can be operated indefinitely with negligible wear. When hydrogen is substituted for water vapor the graphite rods dust away at wear rates approaching those observed in vacuum. No lubricant effect with this gas, hydrogen, is noted even at a pressure of 600 mm. Hg.

Nitrogen and carbon monoxide also show no lubricant effect, at least in the pressure range up to 600 mm. Hg, the graphite wearing in these gases as in vacuum. Oxygen shows a lubricant effect, similar to that of water vapor but at pressures higher by a factor of about 100 (i. e. a pressure of 200–400 mm. Hg is required to lower the wear rate to the zero range noted with water at about 3 mm. Hg). On the other hand, the easily condensable vapors produce complete lubrication and consequently very low wear rate at pressures below 5 mm. Hg. These vapors include ammonia, acetone, benzene, ethanol, diethylether, hexamethyldisiloxane, and n-hexane. In general the efficiency of the gas or vapor in the lubrication process seems to increase with boiling point (or ease of condensation), although there is indicated an additional specific factor relating to composition, as shown by the difference between oxygen (B. P., $-183$) and nitrogen (B. P., $-196$).

The graphitic carbon wear-dust described and claimed hereinafter may be made, for instance, by pressing rods of graphitic carbon against a rotating metal (e. g. copper) or carbon disc in a vacuum or in the presence of a non-lubricating gas (e. g. a dry gas of the inert gas group such as argon or air free of moisture). More particularly, the production of this chemically active graphitic carbon powder is accomplished by pressing the face of a rotating rotor against a graphitic carbon brush in a chamber which has been evacuated, or filled with a non-lubricating gas. The preparation of the "wear-dust" is also aided by reducing the pressure within the chamber to a sub-atmospheric value. Under these conditions, the graphitic carbon seizes and is rapidly disintegrated into a dust. The final comminuted product may then be collected and stored in gastight containers to keep the wear-dust fresh (chemically active). This fresh dust immediately adsorbs, apparently by chemical rather than physical action, gases such as hydrogen, nitrogen, etc., if present. The adsorption is substantially the same whether the dust is formed in the presence of the gas it adsorbs directly, or whether it is formed in vacuum and the gas admitted after comminution has stopped. Furthermore, it occurs independently of the type of metal employed as the moving base, and it is observed also with graphite rods bearing upon a graphite disc.

In the drawing, Fig. 1 shows a chart of graphite wear rate in mm.$^3$/second vs. water vapor pressure, in mm. Hg as referred to hereinafter.

Fig. 2 is a diagrammatic illustration of the system and machine suitable for carrying out my invention.

Referring now to Fig. 2 of the drawing, the comminuting apparatus of the present invention comprises a gas-tight chamber 1, within which is located a rotatably mounted comminuting wheel 2. The comminuting wheel is mounted by trunnions 3 which are supported by two bearing block standards 4. One of the trunnions is extended beyond its standard and is shown as shaft 5 to which is coupled one half of a magnetic coupling 6 which is also contained within the gas-tight chamber 1. Mounted on wall 7 of chamber 1 are the guide and feed means for directing the graphite rod 8 against the surface of the comminuting wheel 2. The guide means is shown as consisting of a collar 9 which is welded onto wall 7 so that the joint will be air-tight. Collar 9 extends past wall 7 into chamber 1 so as to better guide the graphite rod 8 after it has been reduced in length during operation of the machine. The collar 9 is threaded 10 at its outside end to receive an end cap 11 and a resilient gasket 12 is provided to make the joint gas tight. Within the collar 9 and cooperating with the graphite rod 8 are a spring 13 and a weight 14 for exerting a constant pressure on the graphite rod. Since wall 7 of the chamber is removable, a resilient gasket 15 is provided to make the joint gas tight.

Two baffle plates 16 are mounted in the chamber for the two-fold purpose of keeping the comminuted material out of the trunnion bearings and for directing the falling particles in such a way that they will be collected by air-tight container 17 provided for that purpose. The base surface 18 of the gas-tight chamber is shaped so as to form a conical section 19 below the comminuting wheel which serves as a means of directing the wear-dust 20 into the removable container 17. A pair of gas-tight stop-cock type valves 21 and 22 are provided which permits continuous operation of the apparatus and a means of disattaching the container 17. Resilient gaskets 23 are provided to make the joints, between the valves 21 and 22, between valve 21 and cylindrical extension 19a of the conical section 19, and between valve 22 and container 17, gastight.

A second half 24 of the magnetic coupling is outside chamber 1 and is mounted on the shaft 25 of a drive motor 26. Ported to the chamber 1 by means of gas-tight tubing 27 is a gas system which has as elements in the system a vacuum pump 28 separated from the rest of the gas system by valve 29. An air or gas inlet 30, controlled by valve 31 is connected to a dryer 32 for removing the water vapor from the entering gas. The dried gas is then compressed by pump 33 and is stored in a pressurized gas tank 34. Suitable valves 35 and 36 are provided to seal off each from the other the compressor 33 and the tank 34, and the tank 34 and the gas-tight chamber 1. A bypass 37 is provided from the dryer 32 to the chamber 1 and a valve 38 is interposed in said by-pass 37 to seal it off as the occasion demands. A purge outlet 39, ported to chamber 1, and a valve 40 for operating said purge outlet is also provided.

A number of methods of operation will be described. In the first, valves 36, 38 and 40 are closed and valve 29 is opened. The vacuum pump is then operated until chamber 1 is completely evacuated. Then valve 29 is closed. The motor 26 is then started up and the resulting rotation is transmitted to the comminuting wheel 2 via the magnetic coupling. In the presence of the vacuum in chamber 1, the graphite seizes, the graphite crystals are ruptured producing the wear-dust 20 which is collected in container 17.

Another method of operation consists in closing valves 36, 38, and 40, opening valve 29 and evacuating chamber 1 as in the first method. Then valve 29 is closed to seal off the vacuum pump. Valves 31 and 38 are then opened and a non-lubricating gas is permitted to enter chamber 1. The gas passes through the dryer and then the dry gas is bled into chamber 1 by valve 38 until some desired pressure is attained. The comminution process is carried on as described in the first method.

Another method is very similar to the second one described except that the gas is dried and then compressed by pump 33 and is held in pressurized tank 34 with valve 36 closed. After chamber 1 is evacuated and valve 29 is shut, valve 36 is opened and the dry non-lubricating gas is permitted to enter the chamber until some desired pressure is reached.

Another method of introducing non-lubricating gas into the gas-tight chamber consists of purging chamber 1 with a non-lubricating gas. This consists of compressing dry non-lubricating gas into tank 34 and then opening only valves 36 and 40. The gas under pressure enters chamber 1 and forces the gases that are in there at that time out of the chamber through purging outlet 39. Then valves 36 and 40 are both closed, the gas remaining in the chamber being non-lubricating in nature. Then, the comminution process is begun and carried on in the manner as previously described.

When it is necessary to replenish the supply of graphite, cap 12 is taken off and weight 14 and spring 13 are removed. Then a new stick of graphite is inserted in collar 9 and all the parts are reassembled. In collecting the wear-dust, after the container 17 is filled, both valves 21 and 22 are closed and then by detaching valve 22 from valve 21, the container 17 and valve 22 can be removed as a unit without exposing the wear-dust to any contaminants and without losing the non-lubricant gas which fills chamber 1. Then another collecting container and valve can be attached and the valves reopened to proceed with the process as before.

It should be obvious that certain modifications and improvements can be readily made, such as (1) using either of the two parallel faces of the comminuting wheel as the comminuting surface instead of the cylindrical face; (2) including the drive motor within the gas-tight chamber so as to do away with the clutching arrangement and (3) using an appendix chilled by a cold body such as liquid nitrogen and projecting into the comminution chamber for the purpose of condensing any water vapor present to insure dryness within the comminution chamber. It should also be obvious that when a magnetic clutch is used, the wall between the two parts of the clutch should be non-magnetic.

In view of the uniqueness of the claimed product and the necessity of distinguishing it from other carbon products, it has been deemed advisable to describe this chemically active graphitic carbon in terms of its dimensions and physical properties, as well as its chemical properties and activity. The general physical appearance of the wear-dust is that in an agglomerated mass it is of a non-flocculent granular nature.

As pointed out hereinabove the comminuted product has an unusual affinity for diatomic or polyatomic gases and will irreversibly adsorb a gas such as hydrogen at room temperature and at low pressure, a phenomenon not shown by activated charcoal. It is well known that certain activated charcoals and other activated forms of carbon will adsorb many gases at low temperatures but upon gentle heating to room temperatures these gases (excepting the oxides) are driven off. Thus, this type of adsorption is reversible. On the other hand it has been found that the graphite wear-dust described herein adsorbs gases such as hydrogen, nitrogen, methane, carbon monoxide, and carbon dioxide, not only at low temperatures but also at room temperature, and furthermore only those which are adsorbed only at low temperatures can later be recovered at higher temperatures. This is due to the fact that the adsorption characteristic of my new product is permanent and irreversible. Because of the irreversible nature of the reaction, it is believed that the adsorption may be chemical in nature. On the other hand, the wear-dust does not adsorb the inert gaseous elements, e. g., neon, helium, argon, etc., at room temperature.

The adsorption of hydrogen by fresh graphite wear-dust, at room temperature, is interpreted as a chemical adsorption satisfying the open valence bonds resulting from the opening of the graphite lattice during the process of frictional seizure. It has been determined that the amount of hydrogen adsorbed by the dust is about 100,000 times greater than that adsorbed by a typical activated charcoal at the same temperature and pressure. This irreversible or chemical adsorption, when measured at room temperature, represents a chemically-active surface of the order of five square meters per gram.

The chemical adsorption discussed above should be differentiated from the physical adsorption of the graphitic carbon wear-dust. The wear-dust is capable of physically or reversibly adsorbing gases at low temperatures. Thus, the reversible or physical adsorption, of the claimed graphitic wear-dust, as measured at low temperatures ($-196°$ C.) indicates a total physical surface area of the order of 435 square meters per gram.

From these data and also from the confirmatory results of electron microscope studies, it has been found that the process of wear results in a fine sub-division of the individual graphite particles, increasing the total surface by several hundred fold to within the range of the finest colloidal carbon blacks (color blacks), but without producing the contaminated surfaces which characterize the colloidal carbon blacks, and which distinguish them from elementary carbon.

Measurements on representative wear-dust samples have indicated that the total surface may be as high as 435 m.$^2$/g. which is many times greater than the total surface of ordinary graphite powder (which is employed to make carbon brushes) which is of the order of 3 to 10 m.$^2$/g. The total surface of typical rods from which the wear-dust may be made is of the order of 1 to 2 m.$^2$/g., and therefore the total surface of the wear-dust is approximately 99.5 to 99.9 per cent fresh surface developed in the wearing process. The results of chemical adsorption tests have shown that the chemical type hydrogen adsorption was approximately 2 cc./g. (std. temp. and press.) and chemical type nitrogen adsorption was approximately 0.2 cc./g. (std. temp. and press.). Thus, only a portion of the fresh surface is chemically active, but this activity is unique in the phenomena of adsorption by carbons.

The 2 cc./g. hydrogen adsorption, determined experimentally, although many times larger than that reported for any previous carbon, is only 2% of the physical monolayer nitrogen adsorption of 100 cc./g. determined at low temperatures (about $-196°$ C.). The hydrogen adsorption would seem to represent the proportion of carbon atoms which have been exposed so as to show one or more strong valences of unsaturation, such as those of free radicals. This exposure would not occur if the graphite crystal is simply delaminated or scaled away, but would occur if the crystal is opened both along the main cleavage plane and at right angles to this plane (so as to uncover both face atoms and edge atoms).

The laminar structure of graphite, together with the indication that the chemically active surface represents only a small proportion of the total surface, suggests that the wear-dust particles are composed of thin plates, and that only edge atoms combine with hydrogen while face atoms in the main cleavage plane of graphite make up most of the total surface area. In this case the area of the chemically active surface and the fraction of the surface atoms which are chemically active may be readily calculated from the lattice dimensions. The main cleavage plane of graphite consists of carbon hexagons with the smallest interatomic distance 1.42 Å and the separation between planes 3.39 Å. The area per carbon atom along an edge perpendicular to the main plane is therefore $1.42 \times 3.39 = 4.81$ sq. Å.

If the hydrogen adsorption is due to one-to-one combination of hydrogen atom with edge carbon atoms, the chemically active surface covered by 1.98 cc. per gram is found to be about 5.12 m.$^2$/g. Any other lattice points reacting with hydrogen would lead to an even smaller value for the area of the chemically active surface. The results of some experiments indicated a total surface area of 435 m.$^2$/g. Since the chemically active surface was determined to be about 5 m.$^2$/g., the remaining total surface, 430 m.$^2$/g., is considered to represent facial area. Although the "chemical" surface represents only a small fraction of the total surface, its absolute magnitude, 5.12 m.$^2$/g., is large compared with the total surface of the rod from which the dust was worn and is comparable with the total surface of natural graphite powders.

In order to determine the value of the equivalent particle size it may be assumed that the particle size represents the diameter of hypothetical spheres (or the edge of cubes), calculated from the equation $d_3 = 6\rho S$ where $d_3$ is in microns when S is in m.$^2$/g. and the density $\rho$ is in g./cc. (2.25 for graphite). It is convenient to use the spherical model for comparison with the more usual forms of black carbon but a laminar model with a large ratio of area to thickness appears much more likely from the evidence. For a plate-like particle of area A and thickness $t$, the surface area may be considered as 2A with only a small error if the ratio of edge surface to total surface is small. The mass of the particle is $At\rho$, and the surface area per unit mass $S = 2/t\rho$. As long as the thickness $t$ remains small compared with the area A, the specific surface area of the graphite is independent of the size and shape of the particle and is determined by the thickness. For wear-dust with $S = 435 \times 10^4$ cm.$^2$/g., therefore, the indicated thickness $t = 20.4 \times 10^{-8}$ cm.

From the specific surface alone there is no limitation on the size and shape of plate-like particles; only the thickness is determined. A probable limitation on the face to edge surface appears in the ratio of total surface (as determined by nitrogen adsorption at $-195°$ C.), to chemical surface (as determined by hydrogen adsorption at room temperature). The ratio of total surface atoms to hydrogen atoms adsorbed chemically has been calculated to be 155:1. If this is assumed to represent the ratio of face atoms to edge atoms, the average size of the plate-like particles of the graphite wear-dust may be calculated. Calculations show that circular plates of average radius 1720 Å and thickness 20.4 Å satisfy the requirements for both "total" and "chemical" surface, assuming combination of hydrogen with edge atoms.

Adsorption methods have provided one of the best means for determining specific surface and, by calculation, the particle diameter of fine pigments.

Of particular interest is the low temperature nitrogen adsorption method. The specific surface area and particle diameter of the graphitic carbon wear-dust was measured by this method, and in the following table, is compared to the specific surface area and particle diameter of representative carbon blacks. The tables below containing the representative values were taken from the book "Surface Area of Colloidal Carbons," vol. 3, pp. 22–23, Columbian Carbon Co. (Binnie and Smith, distributors), printed by Mack Printing Co., Easton, Pa., copyright 1942.

The method of nitrogen adsorption used is explained fully in the paper by S. Brunauer, P. H. Emmett, and E. Teller, Journal American Chemical Society, 60, 309 (1938).

TABLE 1

*Particle size and surface area by nitrogen adsorption (Emmett et al.)*

| Carbon | Area (Sq.m./g.) | Diameter (mμ) |
| --- | --- | --- |
| Micronex | 106.7 | 31 |
| P-33 | 22.12 | 151 |
| Arrow Black | 112.7 | 29 |
| Wyex | 110.2 | 30 |
| Thermax | 7.69 | 430 |
| Thermatonic | 6.81 | 490 |
| Acetylene | 64.5 | 52 |
| Graphite Wear Dust | 435. | 6 |

TABLE 2

*Particle size and surface area by nitrogen adsorption (Smith et al.)*

| Carbon | Surface Area (sq.m./g.) | Diameter (Calculated) (mμ) |
| --- | --- | --- |
| NONIMPINGEMENT BLACKS | | |
| P-33 | 15 | 213 |
| Lampblack | 28 | 114 |
| Gastex | 40 | 80 |
| Acetylene | 64 | 50 |
| IMPINGEMENT BLACKS | | |
| Graphitized Black | 90 | 35 |
| Grade 9 Rubber | 100 | 32 |
| Grade 6 Rubber | 114 | 28 |
| Grade 3 Rubber | 135 | 23.6 |
| CK-3 | 100 | 32. |
| E. Ink Black | 110 | 29. |
| M. Ink Black | 350 | 9. |
| 80 Color Black | 140 | 23 |
| 71 Color Black | 330 | 9.7 |
| S. C. Color Black | 391 | 8 |
| C. I. Color Black | 947 | 3.3 |
| Graphite Wear Dust | 435 | 6. |

It can readily be seen that the graphite wear dust has a much greater area and smaller size than those of the carbons listed above and examined by Emmett et al., and similar results as to all but one carbon is shown when comparing Smith et al. results. It should be remembered that the impingement blacks are produced by combustion process and the products do not have any special chemical activity or affinity. As far as is known, the claimed graphite wear-dust is the smallest size carbon produced by mechanical means, and it has chemical properties which are not found in any of the thermally produced carbon blacks.

Preliminary studies of irreversible nitrogen adsorption by the graphite wear-dust indicate results that are considerably less than that for hydrogen. On two tests, the nitrogen adsorption has been found to be 0.18 cc./g. (STP) or higher. The fact that it is so large is rather remarkable since molecular nitrogen does not react chemically with activated charcoal as pointed out by R. B. Anderson and P. H. Emmett, J. Phys. Colloid Chem., 51, 1327 (1947). Preliminary adsorption data for methane showed an adsorption of about one-half that obtained with hydrogen; that is, approximately the same number of hydrogen atoms were involved per gram of graphitic wear-dust for these two gases. The carbon monoxide adsorption is indicated to be of the same order as for hydrogen.

One of the uses which may be made of this new chemically active graphitic carbon powder is that it may be used to purify the gases of the inert element group by "cleaning up" the traces of nitrogen and hydrogen which at present are so difficult to remove. This use is described and claimed in my copending application Serial No. 43,855, filed August 12, 1948, referred to above. Another use is as a getter in vacuum tubes. A getter is a material that will permanently remove undesirable gases from a vacuum device by combining with the undesirable gases such as carbon monoxide, carbon dioxide, nitrogen, hydrogen, oxygen, etc.

It is true that the product of the present invention is primarily elemental from a chemical viewpoint. It is also true, however, that it constitutes a new and useful product which is distinguished clearly by its physical properties and its chemical characteristics from all generally similar products. Thus, while several representative uses of the product are described above, it will be understood that the uses are not to be limited to those described above, as further uses will suggest themselves to those skilled in the art.

While I have shown a particular embodiment of my invention, it will be understood, of course, that I do not wish to be limited thereto since many modifications may be made, and I therefore contemplate by the appended claims to cover any modifications as fall within the true spirit and scope of my invention.

What I claim as new and desire to secure by Letters Patent of the United States is:

1. A method for producing chemically active ultra-fine sized graphite particles comprising the steps of evacuating the space enclosed by the air tight housing in which the comminution process takes place, and then comminuting the graphite within said evacuated housing by pressing it against a moving surface.

2. A method for producing chemically active ultra-fine sized graphite particles comprising the steps of evacuating the space enclosed by the air tight housing in which the comminution process takes place, then filling the gas-tight housing with gas chosen from the gases of the inert gas chemical group, and then comminuting the graphite within said housing in the presence of said gas by holding said graphite against a rotating surface.

3. A method for producing chemically active ultra-fine sized graphite particles comprising the steps of purging the gas-tight housing in which the comminution process takes place with substantially dry sub-atmospheric pressure air having a partial water vapor pressure of less than 1 mm. Hg, then sealing said housing and then comminuting the graphite within the space enclosed by said housing in the presence of said dry air said comminuting being carried out by holding the graphite against a rotating surface.

4. A method for producing chemically active ultra-fine graphite particles comprising the steps of evacuating a space enclosed by an air-tight housing, filling said space with a gas chosen from the group consisting of dry air, nitrogen, hydrogen, carbon monoxide, argon, neon, and helium and comminuting a graphite body within said gas-filled space by wear against a moving surface.

5. A method for producing chemically active ultra-fine sized graphite particles comprising the steps of evacuating the space enclosed by the air-tight housing in which the comminution process takes place, then filling the gas-tight housing with dry nitrogen gas, and comminuting the graphite within said housing in the presence of said gas by holding said graphite against a rotating surface.

ROBERT H. SAVAGE.

REFERENCES CITED

The following references are of record in the file of this patent:

UNITED STATES PATENTS

| Number | Name | Date |
|---|---|---|
| 213,471 | Toufflin | Mar. 18, 1879 |
| 612,593 | Mertes | Oct. 18, 1898 |
| 721,039 | Hazelton | Feb. 17, 1903 |
| 920,857 | Frank | May 4, 1909 |
| 1,385,447 | Hamilton | July 26, 1921 |
| 1,575,717 | Plauson | Mar. 9, 1926 |
| 1,793,098 | Kramer | Feb. 17, 1931 |
| 1,992,556 | Tone | Feb. 26, 1935 |
| 2,062,109 | Rogers | Nov. 24, 1936 |
| 2,212,544 | Lund | Aug. 27, 1940 |
| 2,316,124 | Sheldon | Apr. 6, 1943 |
| 2,448,243 | Anderson | Aug. 31, 1948 |